(12) United States Patent
Sloan et al.

(10) Patent No.: US 7,315,837 B2
(45) Date of Patent: Jan. 1, 2008

(54) COMMUNICATION INTERFACE FOR A FINANCIAL MODELING AND COUNSELING SYSTEM

(75) Inventors: Ronald E. Sloan, Toronto (CA); Stephen B. Slutsky, Toronto (CA)

(73) Assignee: Accenture LLP, Chicago, IL (US)

( * ) Notice: Subject to any disclaimer, the term of this patent is extended or adjusted under 35 U.S.C. 154(b) by 0 days.

(21) Appl. No.: 09/929,735

(22) Filed: Aug. 13, 2001

(65) Prior Publication Data

US 2002/0091607 A1    Jul. 11, 2002

(51) Int. Cl.
*G06Q 40/00*    (2006.01)
(52) U.S. Cl. ...................... 705/36 R; 705/35
(58) Field of Classification Search .............. 705/36 R, 705/26, 8, 35, 36; 345/854; 434/350; 706/45; 707/2; 709/246; 704/235; 713/166
See application file for complete search history.

(56) References Cited

U.S. PATENT DOCUMENTS

| | | | |
|---|---|---|---|
| 4,896,291 A | 1/1990 | Gest et al. | |
| 4,953,085 A | 8/1990 | Atkins | |
| 5,132,899 A | 7/1992 | Fox | |
| 5,185,696 A | 2/1993 | Yoshino et al. | |
| 5,193,056 A | 3/1993 | Boes | |
| 5,214,579 A | 5/1993 | Wolfberg et al. | |
| 5,222,019 A | 6/1993 | Yoshino et al. | |
| 5,729,700 A | 3/1998 | Melnikoff | |
| 5,761,442 A | 6/1998 | Barr et al. | |
| 5,784,696 A | 7/1998 | Melnikoff | |
| 5,799,287 A | 8/1998 | Dembo | |
| 5,806,049 A | 9/1998 | Petruzzi | |
| 5,819,263 A | 10/1998 | Bromley et al. | |
| 5,826,250 A | 10/1998 | Trefler | |
| 5,852,811 A | 12/1998 | Atkins | |
| 5,870,550 A | 2/1999 | Wesinger, Jr. | |
| 5,875,437 A | 2/1999 | Atkins | |

(Continued)

FOREIGN PATENT DOCUMENTS

JP    410093729 A    9/1996

(Continued)

OTHER PUBLICATIONS

Press release, "Kana and Webline Team to Provide Industry's Most Comprehensive Online Customer Interaction Solution"; Business Wire; New York; Apr. 20, 1999, pp. 1-3, extracted on Internet from http://proquest.umi.com on Mar. 4, 2003.*

(Continued)

*Primary Examiner*—Yogesh C. Garg
(74) *Attorney, Agent, or Firm*—Oppenheimer, Wolff & Donnelly LLP

(57) ABSTRACT

The present invention provides a method and a computer system for providing a communication medium over a network for financial modeling and counseling. The system includes financial modeling using a profile of a user and provides automated customized financial coaching directly to the user in a web-based environment. The financial coaching is based on the financial modeling and the profile and includes suggestions for changes to the user's current financial portfolio. The suggestions are presented in a natural language format and include financial products and recommended securities for the user to purchase. The financial advisor may provide live financial coaching such that the user is assisted in achieving financial goals and optimizing long-term goals.

15 Claims, 14 Drawing Sheets

U.S. PATENT DOCUMENTS

| | | | |
|---|---|---|---|
| 5,884,287 A | 3/1999 | Edesess | |
| 5,893,079 A | 4/1999 | Cwenar | |
| 5,903,879 A | 5/1999 | Mitchell | |
| 5,911,135 A | 6/1999 | Atkins | |
| 5,918,217 A | 6/1999 | Maggioncalda et al. | |
| 5,930,774 A | 7/1999 | Chennault | |
| 5,940,812 A | 8/1999 | Tengel et al. | |
| 5,963,625 A | 10/1999 | Kawecki et al. | |
| 5,963,925 A | 10/1999 | Kolling et al. | |
| 5,970,478 A | 10/1999 | Walker et al. | |
| 5,978,778 A | 11/1999 | O'Shaughnessy | |
| 5,987,436 A | 11/1999 | Halbrook | |
| 5,999,918 A | 12/1999 | Williams et al. | |
| 6,003,018 A | 12/1999 | Michaud et al. | |
| 6,006,201 A | 12/1999 | Berent et al. | |
| 6,012,042 A | 1/2000 | Black et al. | |
| 6,012,043 A | 1/2000 | Albright et al. | |
| 6,012,044 A | 1/2000 | Maggioncalda et al. | |
| 6,018,722 A | 1/2000 | Ray et al. | |
| 6,018,768 A | 1/2000 | Ullman et al. | |
| 6,021,397 A | 2/2000 | Jones et al. | |
| 6,055,514 A | 4/2000 | Wren | |
| 6,058,378 A | 5/2000 | Clark et al. | |
| 6,064,984 A | 5/2000 | Ferguson et al. | |
| 6,064,986 A | 5/2000 | Edelman | |
| 6,069,628 A | 5/2000 | Farry | |
| 6,078,904 A | 6/2000 | Rebane | |
| 6,081,768 A | 6/2000 | Hu | |
| 6,125,355 A | 9/2000 | Bekaert et al. | |
| 6,195,697 B1 | 2/2001 | Bowman-Amuah | |
| 6,230,197 B1 | 5/2001 | Beck et al. | |
| 6,233,566 B1 | 5/2001 | Levine et al. | |
| 6,253,192 B1* | 6/2001 | Corlett et al. | 705/36 R |
| 6,282,520 B1 | 8/2001 | Schirripa | |
| 6,292,787 B1 | 9/2001 | Scott et al. | |
| 6,292,827 B1 | 9/2001 | Raz | |
| 6,317,726 B1 | 11/2001 | O'Shaughnessy | |
| 6,324,523 B1 | 11/2001 | Killeen, Jr. | |
| 6,327,586 B1* | 12/2001 | Kisiel | 707/2 |
| 6,332,154 B2 | 12/2001 | Beck et al. | |
| 6,336,102 B1 | 1/2002 | Luskin et al. | |
| 6,349,290 B1 | 2/2002 | Horowitz et al. | |
| 6,370,355 B1* | 4/2002 | Ceretta et al. | 434/350 |
| 6,370,508 B2 | 4/2002 | Beck et al. | |
| 6,388,688 B1* | 5/2002 | Schileru-Key | 345/854 |
| 6,393,412 B1 | 5/2002 | Deep | |
| 6,430,542 B1 | 8/2002 | Moran | |
| 6,470,325 B1 | 10/2002 | Leemhuis | |
| 6,513,069 B1 | 1/2003 | Abato et al. | |
| 6,539,419 B2 | 3/2003 | Beck et al. | |
| 6,567,796 B1* | 5/2003 | Yost et al. | 707/2 |
| 6,574,600 B1 | 6/2003 | Fishman et al. | |
| 6,601,044 B1 | 7/2003 | Wallman | |
| 6,606,606 B2* | 8/2003 | Starr | 705/36 R |
| 6,615,240 B1 | 9/2003 | Sullivan | |
| 2001/0032207 A1 | 10/2001 | Harley et al. | |
| 2001/0039493 A1* | 11/2001 | Pustejovsky et al. | 704/235 |
| 2002/0046074 A1* | 4/2002 | Barton | 705/8 |
| 2002/0087496 A1* | 7/2002 | Stirpe et al. | 706/45 |
| 2002/0099613 A1* | 7/2002 | Swart et al. | 705/26 |
| 2002/0161928 A1* | 10/2002 | Ndili | 709/246 |

FOREIGN PATENT DOCUMENTS

| | | |
|---|---|---|
| JP | 411110447 A | 4/1999 |
| JP | 2000163030 A | 6/2000 |
| WO | WO0137187 | 5/2001 |

OTHER PUBLICATIONS

Campbell, Tricia, "Get plugged in: Service with a :-)"; Sales and Marketing Management, New York; Mar. 1999; pp. 62-68, vol. 151, Issue 3, extracted on Internet from http://proquest.umi.com on Mar. 4, 2003.*

Press release, "Webline Communications Unveils New Customer Interaction Software Suite for Enabling Interactive E-Commerce and Customer Service"; Business Wire; New York; Aug. 16, 1999, pp. 1-4, extracted on Internet from http://proquest.umi.com on Mar. 4.*

Press release, "Webline Communications' Products Selected By Trimark Investments To Increase Service On financial Advis Web Site"; Business Wire; Mar. 22, 1999, extracted on Internet from Dialog database on Feb. 26, 2003.*

Press Release, "ZY.COM: ZY.com makes creating and publishing websites simple and FREE for everyone", M2 Presswire; Coventry; Mar. 26, 1998, pp. 2, extracted on Internet on Oct. 29, 2001 from Proquest database [http://proquest.umi.com/pqdweb].

"Personal financial software", The CPA Journal, New York, Sep. 1999, vol. 69, Iss. 9; p. 40, 7 pgs, Proquest, describes numbers of software packages on the market for providing automated coaching for a financial modeling.

Glenn Kennedy et al., "Web to watch CAD companies online", from CADalyst, Sep. 1, 2000.

Rob Fanjogy, "New design software connects colleagues", from Professional Builder, Mar. 1, 1999.

"Sams Teach Yourself the Internet in 24 Hours," by Ned Snell, Sams Publishing, published Jun. 17, 1999, http://proquest.safaribooksonline.com/JVXSL.asp (last accessed on Jul. 21, 2005).

* cited by examiner

COMMUNICATION INTERFACE FOR A FINANCIAL MODELING AND COUNSELING SYSTEM

FIELD OF INVENTION

The present invention relates generally to a web-enabled computerized information systems and more particularly to Internet-based financial modeling and counseling systems.

BACKGROUND OF THE INVENTION

Financially prudent individuals typically engage in extensive planning to develop plans that will aid them in achieving their financial goals. Traditionally, many individuals have entrusted their financial plans to personal financial advisors.

More recently increasing numbers of individuals are relying on computer-based systems that organize their financial assets and liabilities and further provide them with a summary of their financial health. However, these systems are limited by their inability to dynamically analyze the financial goals. These limitations are counterproductive to the user's needs to develop and manage an integrated personal financial plan from an executive decision-making perspective. Furthermore, these systems fail to capture the user's financial intentions and expectations about their future. Also, these systems typically rely on the user to continually update their personal financial data. Furthermore, the user learns very little from the process and remains heavily dependent on the system to provide an accurate summary of their financial health.

Without user executive decision making powers, these financial modeling system are nothing more than expensive financial calculators. In order for an individual user to assume executive decision making power, he requires coaching and guidance. Traditional financial advising is prohibitively expensive for most average investors.

Therefore a financial system is needed that provides automated low cost context sensitive and specific coaching to a user. However, even using such a system, situations arise that require the user to turn to a human advisor and benefit from his experience, and judgment. Therefore, an ideal financial system has to allow the user to communicate with a human advisor in a collaborative environment, when the user sees the need to do so. For most other activities the user needs to be fully supported by an automated coaching system. Such automated coaching system allows the most economical way of using a financial modeling and counseling system.

SUMMARY OF INVENTION

The present invention operates within the framework of a web-enabled financial modeling and counseling system wherein the system offers both automated coaching and live coaching and/or advising to the user. The present invention offers the user a variety of options to communicate with a live coach in a collaborative environment. Since no automated coach can be trusted to provide the judgment and expertise of a human advisor, communication with the live coach or advisor is an important part of a financial counseling system.

In a preferred embodiment of the present invention the user may communicate with a live advisor in a collaborative environment using a variety of communication means such as voice over the Internet, still images, live streaming audio and video images, electronic mail, electronic chat, stand alone telephone. The user may communicate with the advisor in a collaborative web-based medium, and thus can share documents and work on them simultaneously in a white board medium.

Access to both an automated coach and a live advisor within the framework of a financial modeling and counseling system, accessible over the Internet, enables the user to take full advantage of an automated system and the benefits of a live coach in a more efficient and affordable fashion and obtain the cost savings and empowering benefits of an automated coaching system and the experience and judgment of a live advisor for specific and predefined problems. These and other advantages of the present invention will be apparent upon a study of the following descriptions and drawings.

BRIEF DESCRIPTION OF THE DRAWINGS

The foregoing and other aspects and advantages are better understood from the following detailed description of a preferred embodiment of the invention with reference to the drawings, in which.

DETAILED DESCRIPTION OF THE PREFERRED EMBODIMENTS

Figure 1:
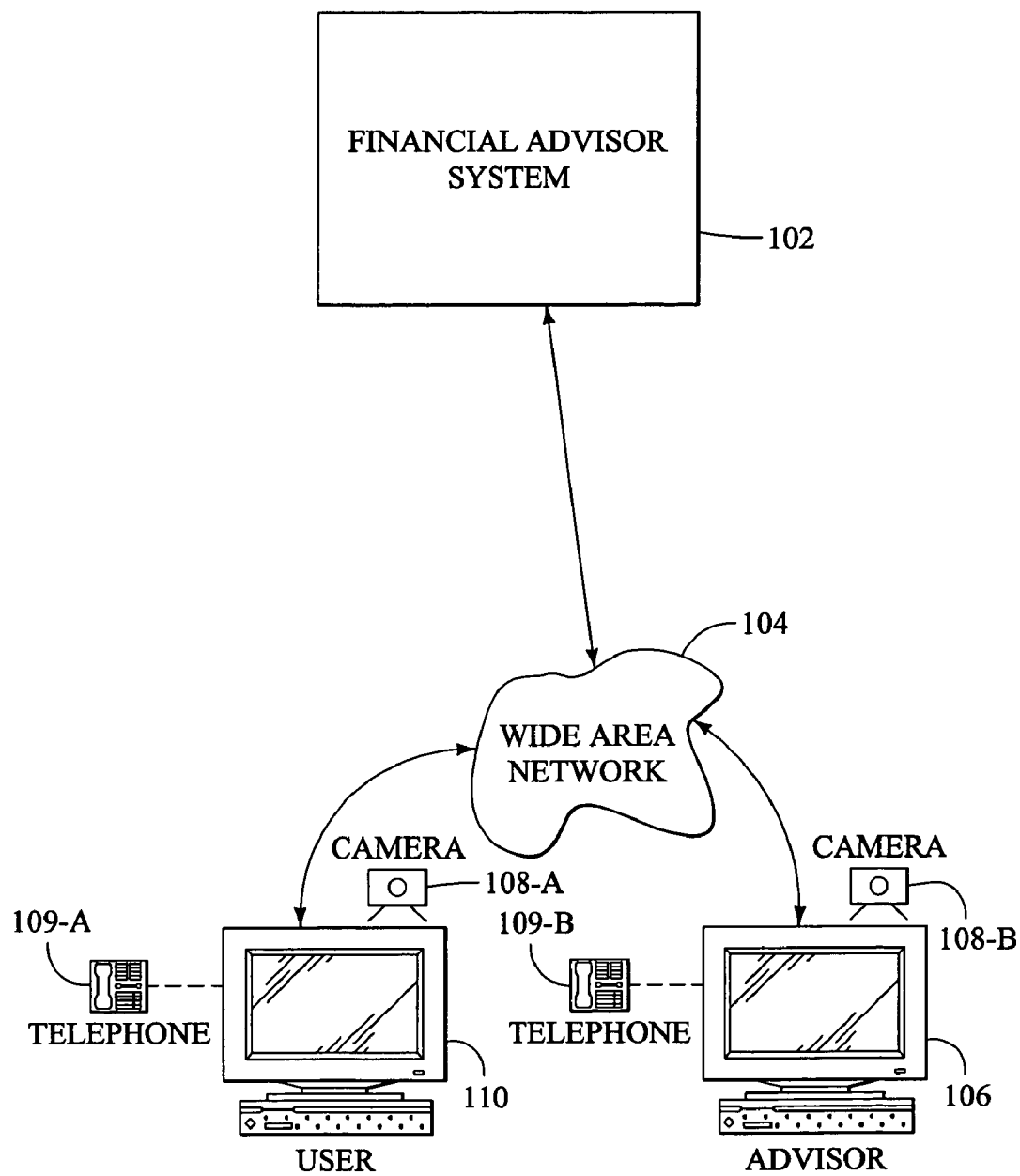
FIG. 1 is a block diagram of a representative hardware environment in accordance with a preferred embodiment.

FIG. 1 is an illustration of one embodiment of a financial management information system, in accordance with the present invention, for providing personalized financial coaching as well as financial advice by a licensed professional, in a collaborative computing environment. The term financial advisor as used herein refers to a live financial advisor and one who may or may not be licensed to provide financial advice. The term financial coaching refers to suggestions made to the user that does not require dispensation by a licensed user. In FIG. 1, financial management system 100 includes a financial coaching system 102 connected through a wide area network 104 to the live advisor terminal 106 a user terminal 110. The wide area network 104 is the Internet. The Internet is based on the TCP/IP communication protocol first developed by the Department Of Defense in the 1960s. The present invention may be implemented using other protocols and other networking system, including wireless networks, the Network File Service (NFS) protocol used by Sun Microsystems or a Novel network based on the UDP/IPX protocol.

Preferably, the financial coaching system 102 communicates with the user through any number of devices such as handheld wireless personal organizers, pagers, cellular telephones, land telephones and regular desktop computers. All of the above equipment can act as a user terminal 110.

The user (e.g. individuals or company representative seeking financial advice or coaching) may access the system using a user terminal 110 (e.g. personal computer). A typical user computer terminal would be described in more detail in FIG. 3. The user computer is preferably equipped with software to receive live streaming video and/or still pictures over the wide area network 104, from the advisor video camera 108-B. Preferably, the user terminal 110 is further equipped with a video camera 108-A and software to transmit live streaming video from the user, across the network 104 to the live advisor at the advisor terminal 106. Access to the live financial advisor 106 and all other services provided by the Financial management system is controlled and channeled through the Financial coaching system 102. The user can access the financial coaching system 102 through the network 104 or by telephone 109-A. A user telephone call is channeled through a call center discussed further subsequently in FIG. 2 to the Financial coaching System and to the live advisor 106.

The live advisor terminal 106 is preferably equipped with the video camera 108-B for transmitting live streaming video. The live advisor 106 may further communicate with the user via a telephone 109-B.

Figure 2:
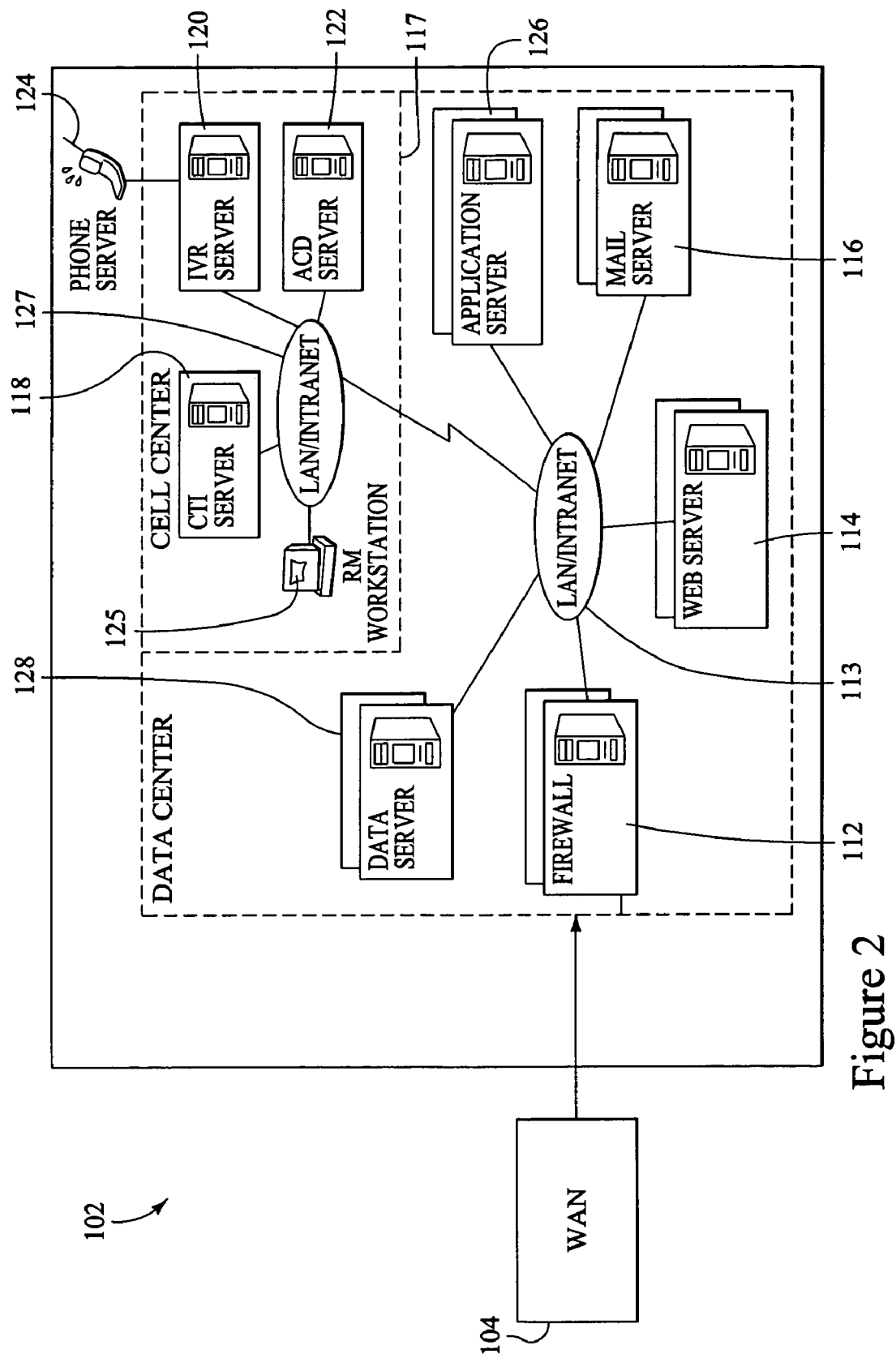
FIG. 2 is a block diagram of a financial management system.

FIG. 2 is a block diagram of an implementation of the financial coaching system 102. The user may access the system through the wide area network 104 and through a firewall server 112. In a preferable implementation of the present invention, the wide area network is the Internet, an intranet, etc. A Web server 114 provides the user with a personalized website providing an interactive interface between the user, the financial advisor and financial management system 100. The financial coaching system 102 further comprises of a mail server 116, an application server 126, a call center 117 and a data server 128, all interconnected through a local area network 113. The local area network (LAN) 113 may be any wide area intranet system or the internet.

Security is important in any financial system. The firewall server 112 controls the access to the financial advisor system. The purpose and functionality of a firewall server is to prevent access to the system by unauthorized users and it would be appreciated by one skilled in the arts. Firewall servers are available through a variety of vendors and have become a standard feature of any secure system used as the primary defense against intruders and hackers.

The web server 114 provides a personalized interactive web page environment for the user to operate in once he accesses the system. The web page is acting as the web interface between the financial system. Web pages are created using the Hyper Text Markup Language (HTML), scripting languages such as Java Script™ or Pearl™ as well as Java™ applets. Creation of customized web page using any of the above programming languages is well within the scope of one skilled in the arts. The personalized web page provides an environment and an interface for the user to interact with the financial coaching system 102. As an example, in one embodiment of the present invention, by selecting an appropriate icon from the interactive personalized website, the user is able to learn, plan, decide, transact and monitor his financial model.

The mail server 116 handles electronic mail communication between the user and the financial advisor system 102. The Mail server 116 may operate using any standard protocol such as Simple Mail Transfer Protocol (SMTP) and it is within the scope of the knowledge of one skilled in the art.

The application server 126 is where the various modules of the financial coaching system reside. The modules include the various coaching engines, the LifePath and the portfolio modeling sub-systems. The applications may be implemented in many programming languages, including the object oriented programming languages such as C++ or Java™ and be based on any platform such as UNIX™, Apple OS™ or Windows™ and NT™. Furthermore, the coaching engine rules for various coaching engine can reside on a data server 180.

Alternatively, the user may also interact with financial coaching system 102 through a telephone 124. The user's call is channeled through the call center system 117. The call center 117 includes an Automatic Call Distribution (ACD) server 122, an Interactive Voice Response Server (IVR) 124, a Computer Telephony Integration (CTI) server 118 and a RM workstation 125, all interconnected through a Local Area Network or intranet 127. The local area network 113 may also be used in interconnecting the various servers of call center. When the user calls into the financial coaching system 102 using a remote telephone 124, the IVR sever 124 receives the user's telephone call. The IVR system greets callers, prompting them for identification, and providing some information automatically. The Automatic Call Distributor (ACD) server 122 distributes the call using the Internet Protocol (IP) over the network, to the appropriate live coach. The Computer Telephony integration server (CTI) 118 acts as the link between the live advisor's telephone call and the workstation based applications and allows them to automatically work together. As an example, when the IVR server 120 obtains some information about the calling user, this information is delivered to the live advisor's workstation 106, so the advisor does not have to request the same information again. Once the telephone call is properly routed to the live advisor, the user can user other means of communication such as electronic mail or white board™ simultaneously while he is interacting with the live advisor.

The Data server 128 stores user input data and supplies the application Server 126. The data server 128 includes outside database sources from which the financial coaching system 102 can draw information such as actuarial data such as historical price data on securities from sources such as Reuters, user financial information such as banking and portfolio information in other financial institution, and market information such as the days closing numbers for various market indices as well as individual stock securities pricing information. Formatted in the Open File Exchange (OFX) format, now the accepted internet standard used by programs such as Quicken™ and MS Money™ the data server through the firewall can easily exchange information with the outside world and specifically the user.

It should be noted that various computing platforms could be used to access the financial management system of the present invention. For example, a networked personal computer environment, a client-server system, a mainframe terminal environment, WEB TV terminal environment, dumb terminal environments can be used to access the financial management system of present invention. Depending upon the user's needs, a client-server system may be the most preferable computing system for implementing the financial system of the present invention. Furthermore, the representation of each server such as an application server or a data server, is a logical representation. The actual physical systems may be distributed over many servers, or be included on a single machine.

Figure 3:
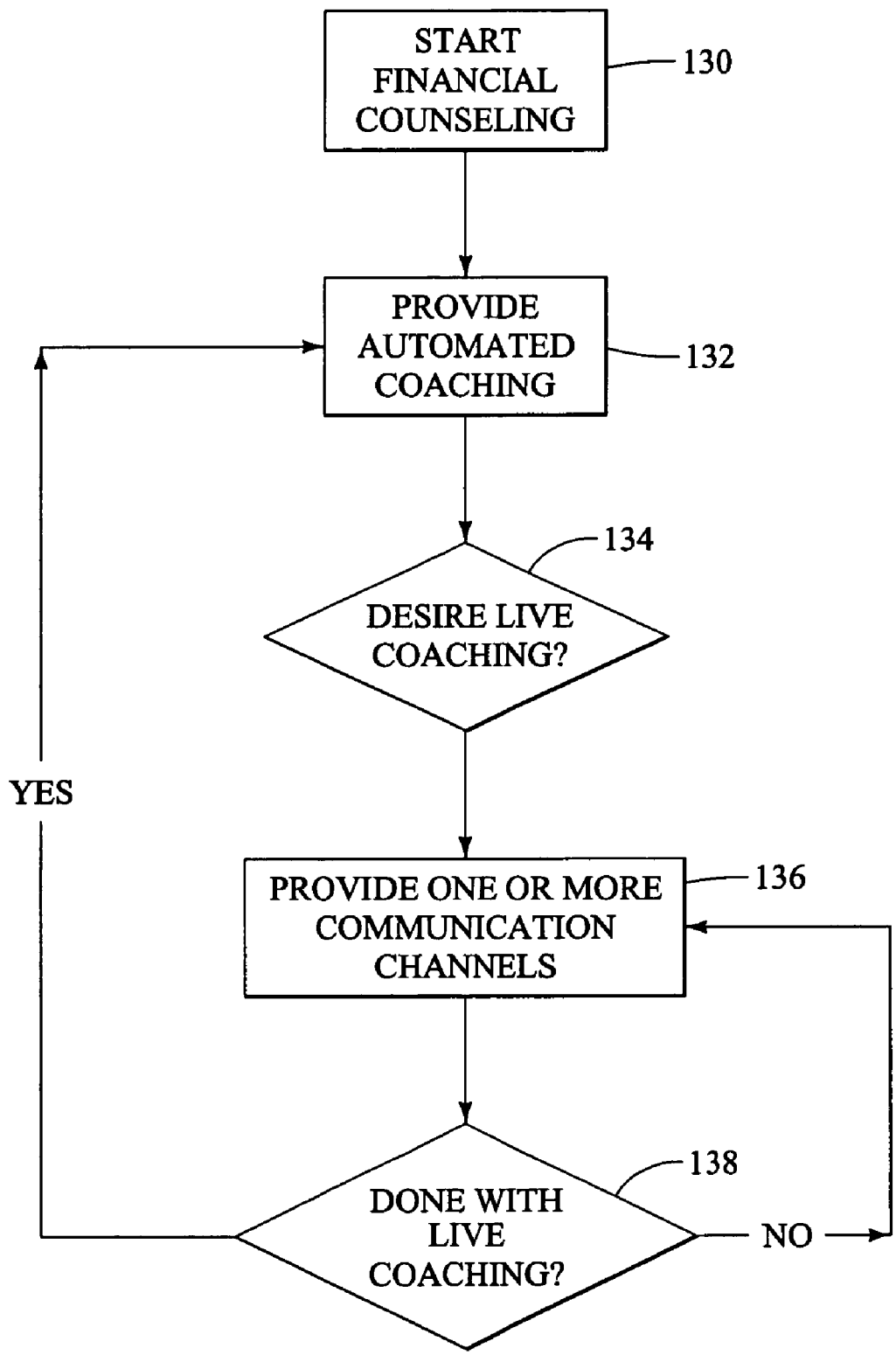
FIG. 3 is a flow diagram of an automated coaching and live coaching in a financial management system.

FIG. 3 depicts the flow diagram of an automated coaching and live coaching in a financial management system. In one embodiment of the present invention, when the user enters the financial modeling and counseling system (note operation 130), the system provides automated coaching for all activities the user performs 132. At particular junctions within an automated coaching system, such as when the automated coaching system makes product recommendations; the user is asked to if he desires to communicate with a live advisor to obtain more specific information 134. As an example if the automated coaching system recommends that the user should obtain particular financing to solve a projected cash flow problem, an automated coach may prompt the user to contact with a live advisor for specific advise on how to deal with the issue. Alternatively, when the automated coaching has presented a filtered list of securities corresponding to the user's personal investment parameters, an automated coach may ask the user if he would like to be connected to a live advisor to obtain more information on the particular securities or place a purchase order for the particular security. If the user accepts the automated coaching can establish a communication channel with a live advisor automatically 136. The user has the option of selecting from a variety of communication means. Once the user finishes a communication session, the automated coach system may ask the user if he is done with live coaching 138. If the user is done with the live advisor, then he may return to automated coaching. If he requires more help from a live advisor, a new communication session may be established by a different means of communication.

Figure 4:
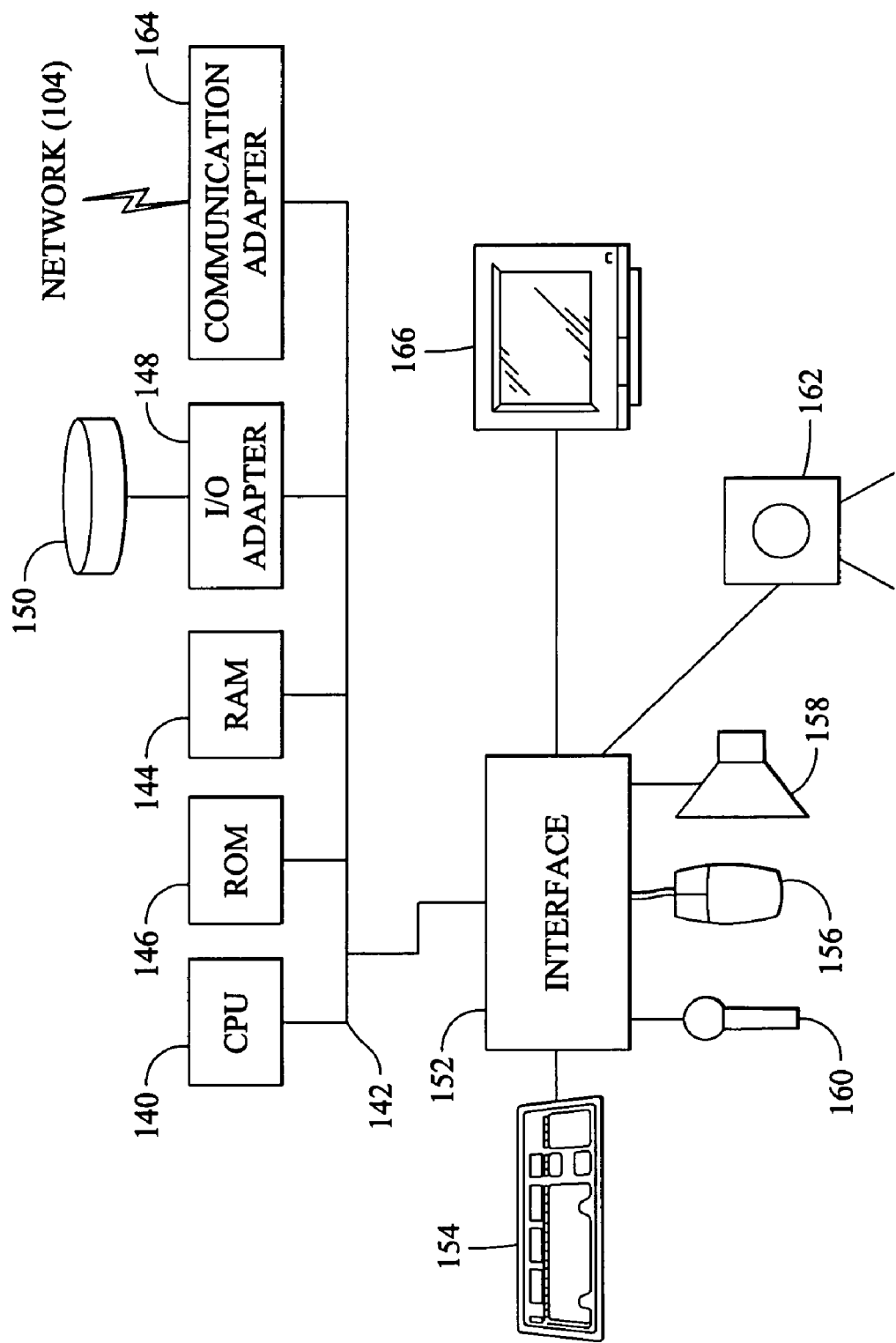
FIG. 4 illustrates a representative system architecture in accordance with a preferred embodiment.

FIG. 4 is a computer system architecture that can be used in implementing the present invention. This computer system architecture can be used to implement a user workstation, or any of the servers called for in the present invention. Alternatively, other computer system architectures are suitable as well. The present invention may be practiced on any of the personal computer platforms available in the market such as an IBM™ compatible personal computer, an Apple Macintosh™ computer or UNIX™ based workstation. The operating system environment necessary to practice the present invention can be based on Windows™, NT™, UNIX™, Apple Operating System™, Solaris™, or open-source code operating system software such as Linux™ and Apache™. Furthermore, the computer system can support a number of processes. As appreciated by one skilled in the art, the processes may be written in any of the available programming languages including object oriented programming languages such as Java™ or C++.

The computer system architecture of FIG. 4 includes of a central processing unit 140, such as a microprocessor, a read only memory (ROM) 146, a random access memory (RAM) 144, an input and output adapter 148, a storage device 150, and interface 152 connecting a plurality of input and output device such as a keyboard 154, a mouse 156, a speaker 158, a microphone 160, a video camera 162 and a CRT display 166, and a system bus interconnecting all the components together. The computer may also include such devices as a touch screen (not shown) connected to the bus 142 and communication adapter 164 such as a dial up modem, a Digital Subscriber Line (DSL) modem or a cable modem, for connecting the workstation to a communication network 104 (e.g., the internet). The storage device 150 can be any number of devices including but not limited to hard disk drive, a floppy drive, CD-ROM, DVD, a tape device, and removable magnetic storage devices such as a Jazz™ drive or ZIP™ drive. There are therefore a number of computer readable media encompassed by the system depicted in FIG. 4, including RAM 144, ROM 146, storage device 150, and storage accessible over the network connection 104.

Figure 5:
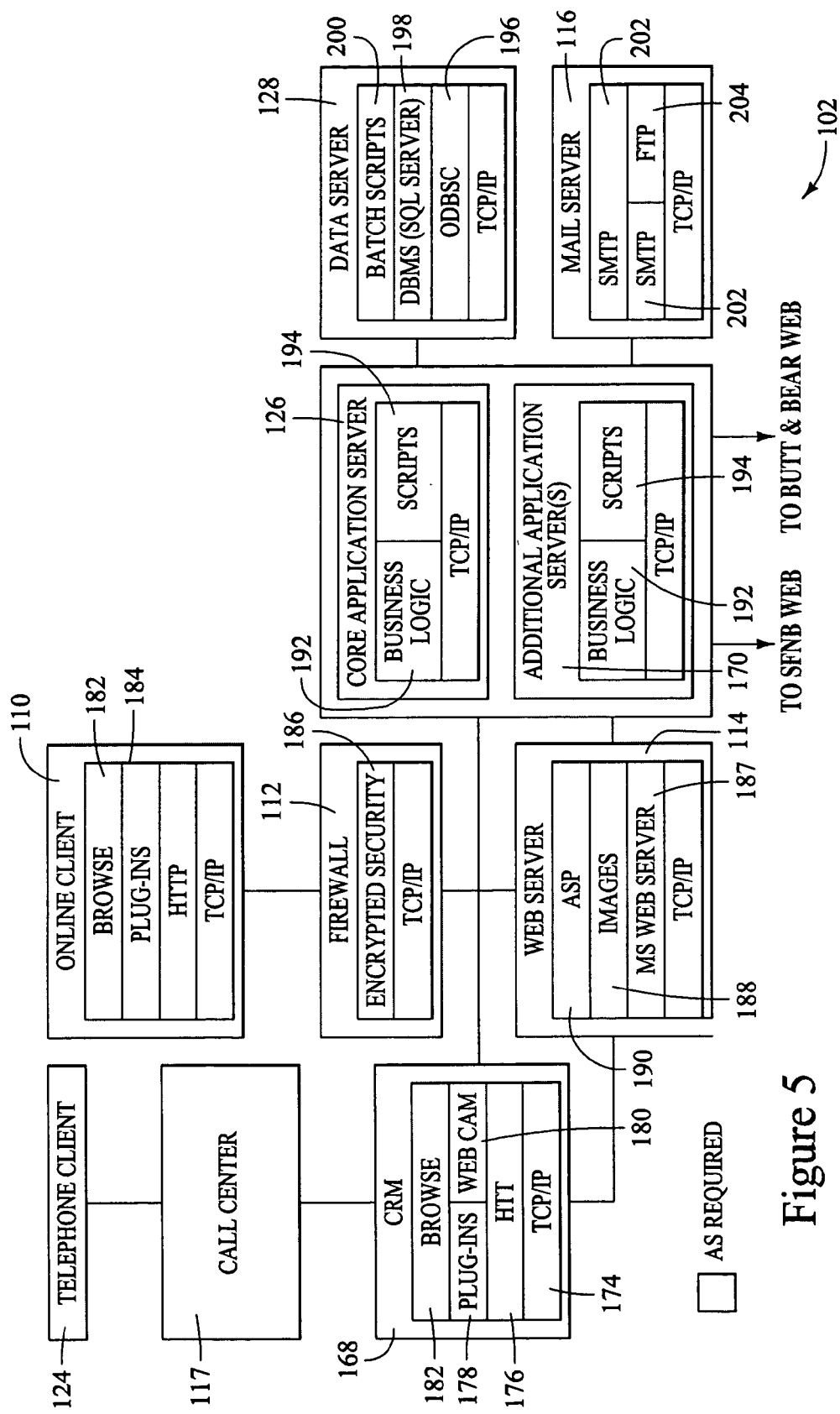
FIG. 5 is diagram of an embodiment of the present invention depicting software layers on various server systems.

FIG. 5 represents the various software layers of one embodiment of the present invention. Layering is a key concept in networking and distributed systems. It involves compartmentalizing complex processes into elementary steps. In one embodiment of the present invention, the financial coaching system 102 comprises of a call center 117 receiving a user's telephone call 124. In one embodiment of the present invention, calls are routed by the call center to the Customer Relation Management (CRM) module 168, where the CRM module directs the call to appropriate live advisor 106.

An online user 110 may contact the financial coaching system 102 by connecting to the web site through a global network 104 such as the Internet. The user 110 may to go through a firewall server 112 that is protecting the financial coaching system 102 from unauthorized access. The user's login name and password may be verified by a firewall server 112 before access to the system is allowed. After the user has been authenticated he reaches his personalized web page residing on the web server 114, from where he may launch the various applications he has authorization to use. The applications reside on the primary application server 126 and possibly on additional application servers 170. The data server 128 supplies all the data needed for the applications such as the user financial information. On the mail server 116 resides the electronic mail software routing the electronic mails into and out of the financial modeling and counseling system.

In one embodiment of the present invention, the Customer Relationship Manager (CRM) 168 communicates with other systems using the Transmission Control Protocol/Internet Protocol or TCP/IP 172. TCP/IP is the protocol used for communications on the Internet. The Hyper Text Transfer Protocol or HTTP 176 is the World Wide Web protocol and operated over the TCP/IP protocol. Operating at the layer above the HTTP layer 176, various application plug-ins 178 and the software for a Web Cam 180 may operate. Web Cam technology has is becoming increasingly popular with the availability of more bandwidth over the network. To operate a Web Cam one only needs a digital video camera 108 and Web Cam software 180. There any many types of digital cameras as well as many types of off the shelve software available from various vendors and operating a Web Cam is well within the knowledge of one skilled in the art.

A browser software 182 may operate over the Web Cam 180 and the Plug-ins layer 178. Most of today's most popular browsers such as the Netscape Navigator™ or the Microsoft Explorer™ operate using the HTTP protocol 176 and allows the user to access, and read Web based documents. A web browser handles most of the details of document access and display. Commercial web browsers are available on the market.

In one embodiment of the present invention, an online client 110 using a browser 182 and various plug-ins 184 operating over the HTTP protocol 176 and communicating over the Internet using TCP/IP protocol 174, may connect to a firewall server 112. Preferably, the firewall server 112 uses encryption software and is compliant with the industry standard Security Sockets Layer protocol 186. RSA corporation public key cryptography is widely used for authentication and encryption in the computer industry.

Public key encryption is a technique that uses a pair of asymmetric keys for encryption and decryption. Each pair of keys consists of a public key and a private key. The public key is made public by distributing it widely. The private key is never distributed; it is always kept secret. Data that is encrypted with the public key can be decrypted only with the private key. Conversely, data encrypted with the private key can be decrypted only with the public key. This asymmetry is the property that makes public key cryptography so useful. Preferably the firewall server communicates with the network using the TCP/IP protocol 174.

A web server 114 may communicate with the network using TCP/IP 174. Operating above that layer, the Microsoft™ Internet Information Server IIS™ 187 is the built-in Web services of Windows NT Server and the software used to operate the web server 114. The web server 114 provides images 188 and Active Server Pages (ASP) 190 for access over a wide area network 104. Active Server Pages are a language-independent framework designed by Microsoft for efficient coding of server-side scripts that are designed to be executed by a Web server in response to a user's request for a Uniform Resource Locator (URL).

A core or primary application server 126 and possible additional application servers 170 supply the actual application software the user uses for financial modeling and counseling. The application server communicates with the rest of the network using TCP/IP protocol 174. The applications comprise of software using business logic 192 and scripts 194.

A data server 128 may provide the data used by the application server 126. Open Database Connectivity™ (ODBC) 196 is a widely accepted application programming interface (API) for database access. Preferably, operating above the ODBC layer, a Data Base Management System (DBMS) software supporting a Structured Query Language (SQL) 198 may be the engine that retrieves and present information to the network. Batch scripts 200 may be used to run queries on the DBMS 198.

A mail server 116 may connect to the Internet using TCP/IP. In accordance with a preferred embodiments of the present invention, operating above the TCP/IP layer, a mail server supporting the File Transfer Protocol (FTP) 204 and Simple Mail Transfer Protocol (SMTP) manages file transfers and electronic mail for the system. The above description is a functional depiction of one embodiment of the present invention. The present invention is not limited to the present architecture.

Figure 6:
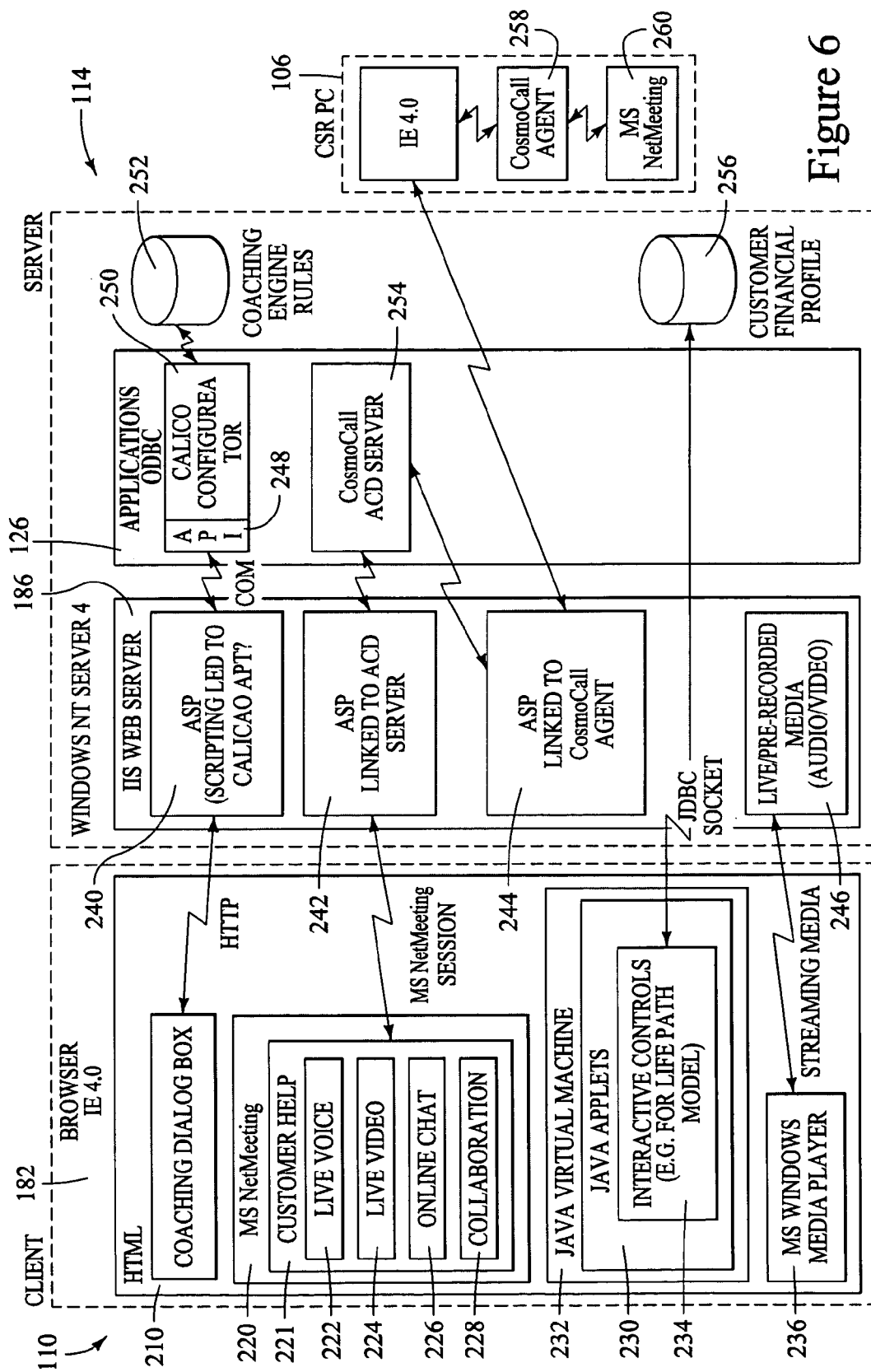
FIG. 6 represents a block diagram of an interaction between a client browser and a financial modeling and counseling system server.

FIG. 6 represents a block diagram of web links between a client browser 182 and the web server 114 and the application server 126 which may physically reside on the same server or on a separate server. The client browser opens and interprets a web page 210 written in Hyper Text Markup Language (HTML). On the web page various selections would allow the user to communicate with the application server 126 and allows the user to request information, or run an application. On the server's side, the user's request is received through Active Sever Pages 240,242, 244. Each user request may triggers a sever-side script that would lunch an application.

In one embodiment of the present invention, when the user selects a coaching icon, a request is sent through the Internet using HTTP 176 protocol and lunches the script for the ASP 240 tied to the Calico Application Programmer's Interface 248. The API processes the script and lunches Calico Configurator 250. The Calico Configurator is a coaching engine available on the market from Calico Commerce Inc. The database 252 provides the coaching engine rules to the Calico Configurator 250.

In another embodiment of the present invention, when the user selects one of the communication options live voice 222, live video 224, online chat 226 or collaboration 228 to communicate with a live advisor 106, meeting session manager such as MS NetMeeting™ 220 launches a meeting session. NetMeeting™ is software program made by Microsoft® Corporation of Redmond, Wash., and is available to the public. Customer help 221 applies to live coaching by a human advisor or coach 106. The application manages over the Internet communication sessions. The request to communicate with a live advisor is processed by the ASP 242 with the appropriate script tied to the ACD server 117 which in turn launches an Automatic Call Distributor program 254 such as CosmoCall™. CosmoCall™ is a software-based automatic call distributor (ACD) eliminating the need for the traditional circuit switched ACDs. CosmoCall™ has a client software which is lunched when a user calls into the system. In a preferred embodiment of the present invention, an Interactive Voice Response (IVR) server 120 initially receives the user's telephone call, an ACD server directs the call to the appropriate live advisor, and a Computer Telephony Integration (CTI) sever 118 may allow the live advisor's telephone call and the workstation-based applications to work together automatically. Furthermore, the ACD server may supports electronic mail, and electronic chat and a collaborative medium such as a white board.

A telephone communication directed through the ACD server can launch an Active Server Page (ASP) 244 which is in turn linked to ACD client or agent program such as CosmoCall Agent™ 258. The ACD agent completes the user's connection to the appropriate live advisor 106, and a communication session manager such as session MS Net-Meeting™ 260 manages the communication session between the user 110 and the live advisor 106.

In another embodiment of the present invention, the user may select a function icon such as an interactive control of a model such as the LifePath model. The user's request is coded in a Java applet 230 which runs on a Java Virtual Machine 232. The selection lunches a connection through the network to the database 256 holding user financial profile information. The user can then manipulate his information while connected to the database.

In yet another embodiment of the present invention, the user can receiving live streaming audio or live streaming video through the network residing on the IIS server's 186. On the user side an application such as MS Windows™ Media Player™ would interpret and allow the user to see or hear the data.

Figure 7:
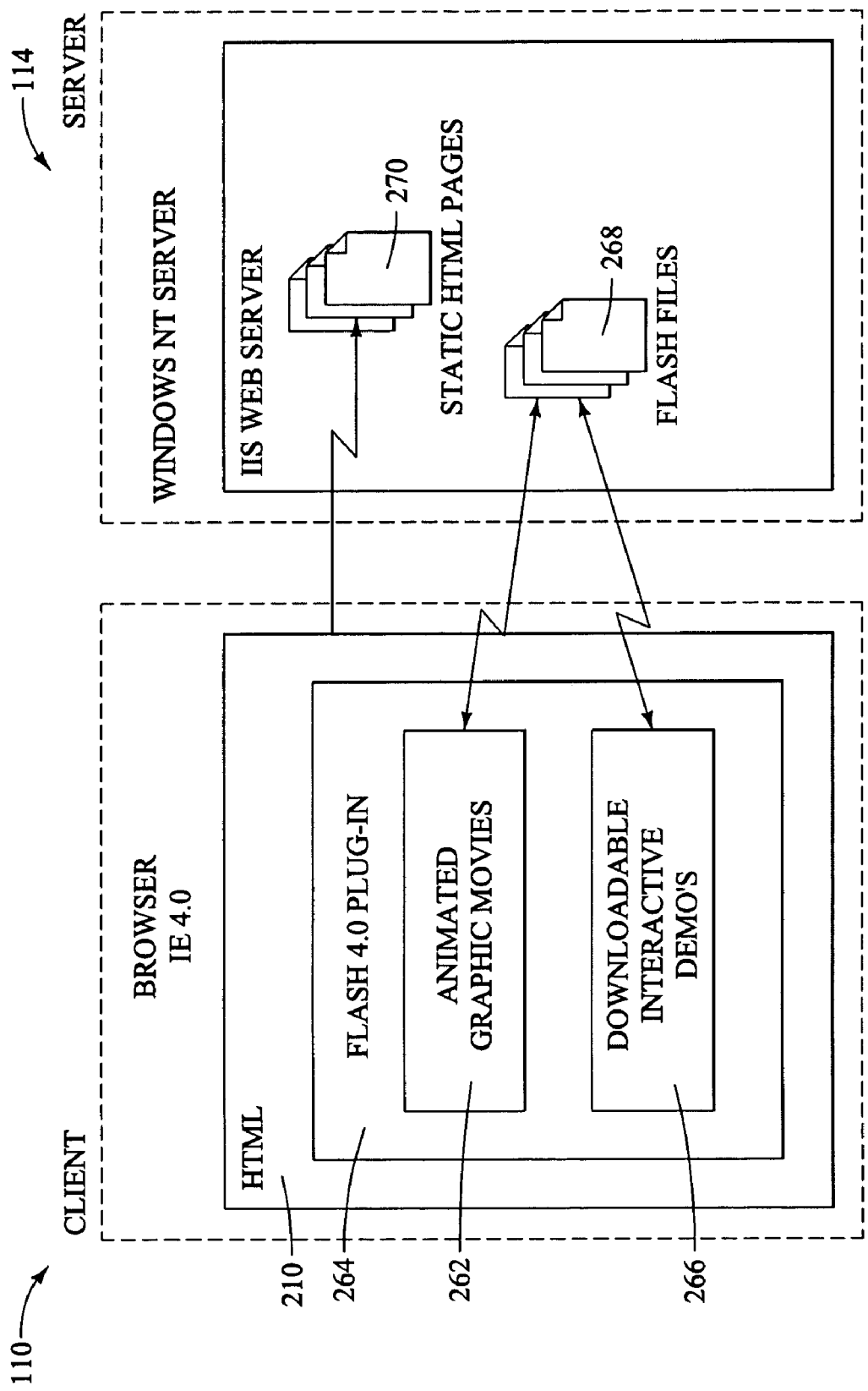
FIG. 7 is a representation of web page level interactions between a client and server.

FIG. 7 is a representation of web page level interactions between a client and server. The user's computer accesses the World Wide Web using a browser such as Internet Explorer™ made by Microsoft™. When the user's browser communicates with the Internet, it downloads web pages written in HTML 210. Within the web page, a plug-in such as the Flash 4.0™ 264 would run server supplied animation on the user's computer. Flash 4.0 264 is a vector based animation tool available from Macromedia™ Inc. The Flash 4.0 plug-in 264 runs the downloaded Flash™ files 268 and run them on the user's computer as animated graphic movies. The Flash™ files 268 may also be downloadable interactive product demonstration clips 266. Static HTML pages 270 residing on the IIS server 186 are interpreted by the user's browser.

Figure 8:
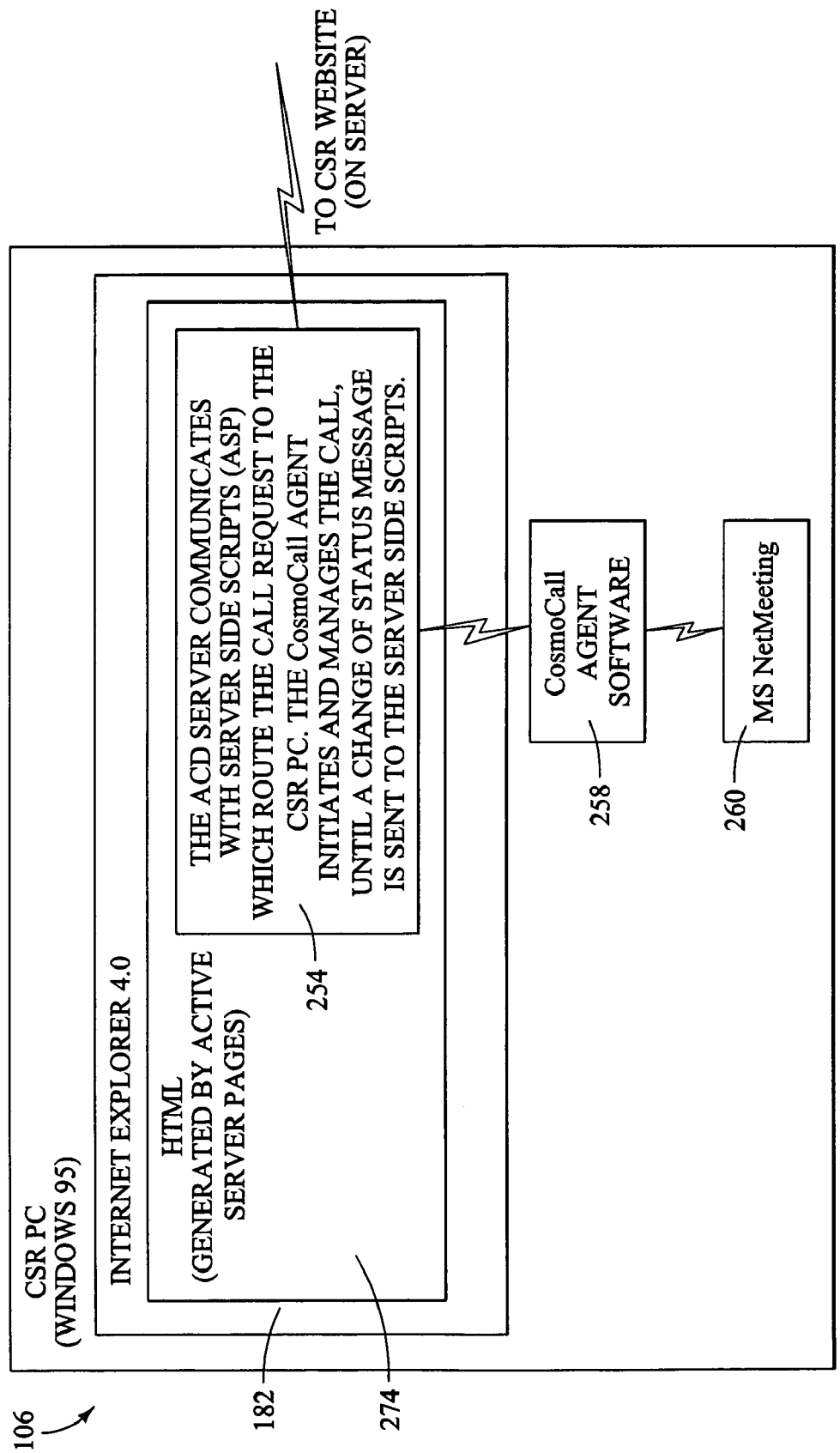
FIG. 8 is a representation an implementation of a live advisor (Customer Support Representative's (CSR)) connection to a communication system.

FIG. 8 represents the implementation of the live advisor or a Customer Support Representative's (CSR) 106 connection to the communication system. In one implementation of the present invention, the user can contact a live advisor using a stand alone telephone such a land telephone or a cellular telephone 124. When the user calls the financial modeling and counseling system, his call is first received by the Interactive Voice Response server 120, which would respond to the user commands and direct him through the Automatic Call Distributor (ACD) server 122 to the appropriate live advisor 106. The Customer Service Representative or the live advisor's computer 106 operates a personal computer operating software such as windows 95™. Furthermore, the live advisor's computer 106 is running a standard web browser such as the Internet Explorer 4.0™ 182. Both these software are off the shelve software packages available from Microsoft™ Corporation. The live advisor's browser can download and interpret HTML pages generated by the Active Server Pages 254. The ACD server 122 communicates with server side scripts (ASP) which routes the call request to the live advisor's computer 106 through the network 104 and through the customer support representative's web site on a remote sever. Call management software such as CosmoCall Agent Software 258 operates on the live advisor's computer 106, and initiates and manages the call until a change of status message is sent to the server side scripts 242. MS NetMeeting™ 260 operates in conjunction with the CosmoCall Agent in managing the communication session.

Figure 9:
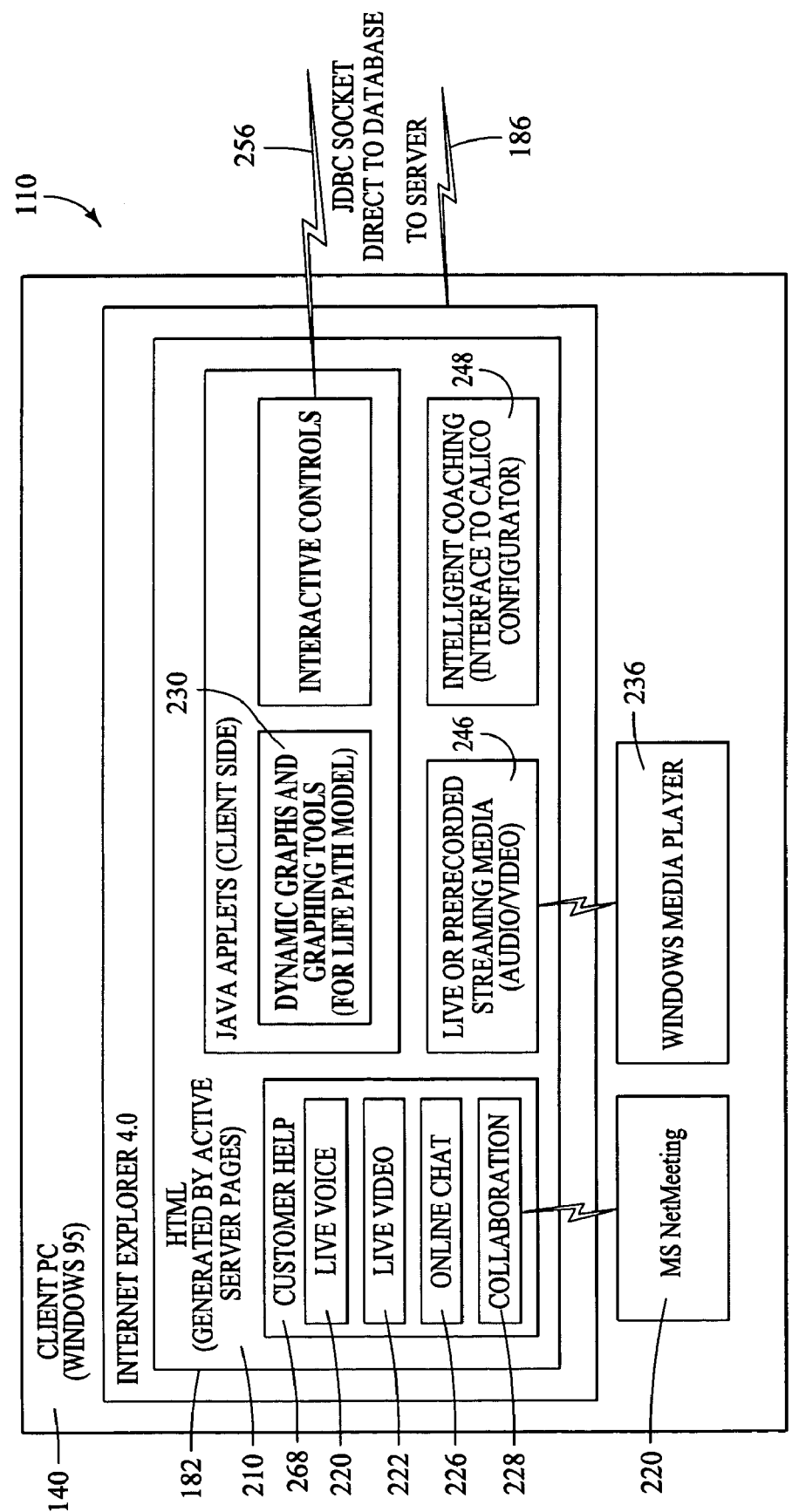
FIG. 9 represents a logical layering of an operating software for a communication system on a client side.

FIG. 9 is a representation of the software implementation of the user connection to the communication system. The user computer runs on a personal computer operating software 140 such as Windows 95™. Furthermore, the user computer connects to the World Wide Web using any web browser available on the market such as Internet Explorer 4.0™ 182. The browser downloads an HTML document 210 generated by Active Server pages (ASP) such as 240, 242, 244. The downloaded HTML document might be the user's personalized web page. The user web page would include various function icons allowing the user to connect to the financial modeling and counseling system 102 and request information or lunch and application. In one embodiment of the present invention, communication with a live coach may be achieved by selecting one of the communication icons such as live voice 220, live video 222, online chat 226 or collaboration 228. The selection of the communication icon may launch a communication session manager software 220 which manages the communication session with the live advisor. The selection of the icon also launches a script on the ASP linked to an ACD sever 122 such as CosmoCall™ which directs the user's call to the appropriate live advisor. The user and the live coach can communicate by voice over the Internet Protocol (IP).

When selecting an icon, the user lunches a Java Applets™ that unable the user to an interactive control such as a slider or a button to manipulate Dynamic graphs and graphing tools for the LifePath model. Selection of a coaching icon might lunch a script on the ASP 240 linked to the Calico Configurator™ coaching engine's API 248. Live or prerecorded streaming media 266 such as audio or video may be lunched by the selection of a help icon or video or voice icon.

A user may retrieve information from the financial modeling and counseling's data base by direct connection 256 by a JDBC™ socket direct to Database from the user's computer 110. JDBC™ technology is an Application Programming Interface (API) that lets you access virtually any tabular data source from the Java™ programming language.

Figure 10:
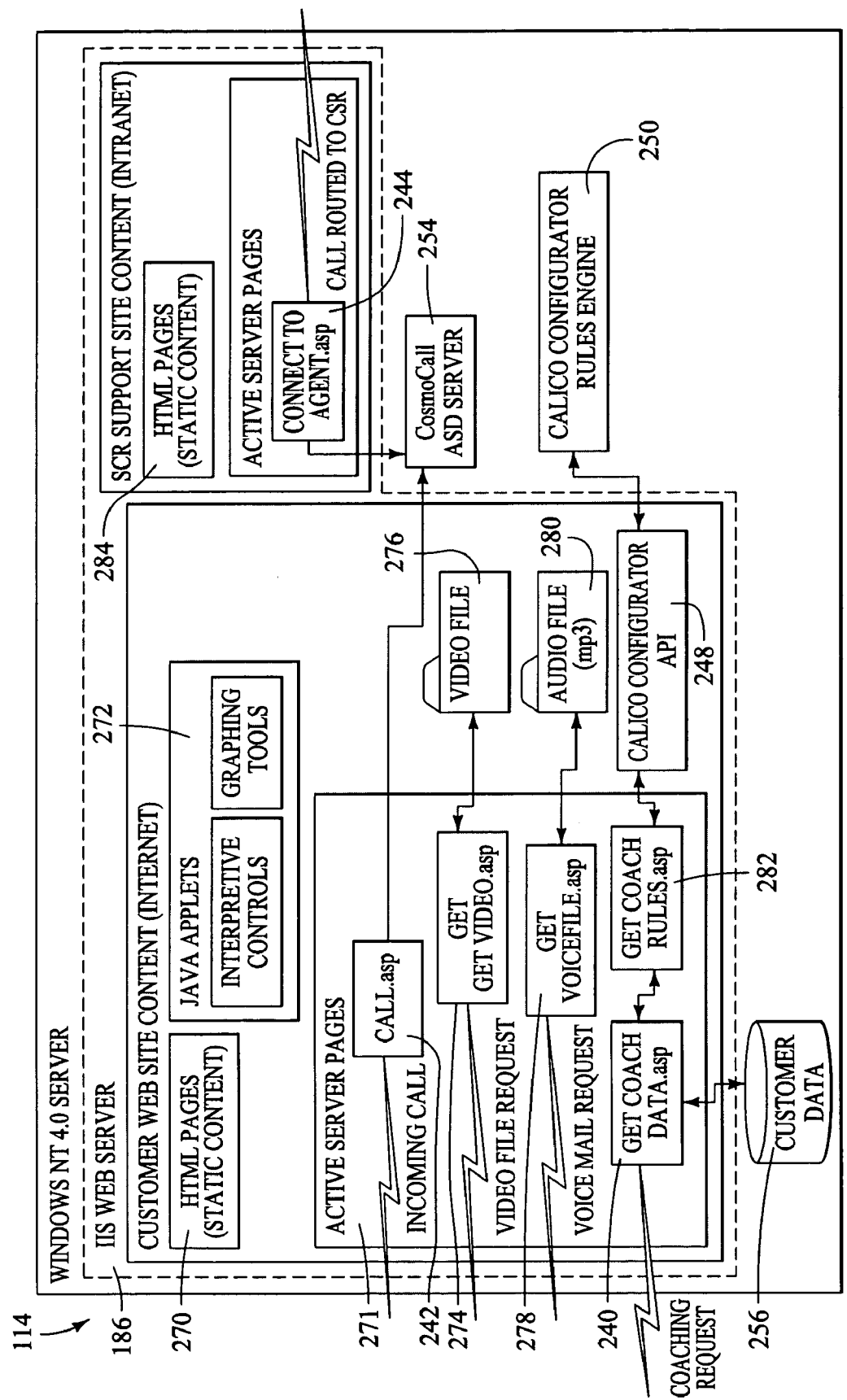
FIG. 10 is a depiction of the various software layers of a server in one embodiment of the present invention.

FIG. 10 is a representative block diagram of any of the web server 114. The web server 148 can any server operating system such as Windows NT 4.0™ from Microsoft™ Corporation. Microsoft Internet Information Server IIS™ 186 is the built-in Web services of Window NT 4.0 server. The customer Internet web site 114 provides the user's computer with static HTML pages 270, Java Applets 272 as well as Active Server Pages 271. A web server program such IIS™ server 186 also may direct user requests to the ACD 254 or the automated coaching engine API 248.

Active Server Pages are a language-independent framework designed by Microsoft for efficient coding of server-side scripts that are designed to be executed by a Web server in response to a user's request for a URL. ASP scripts are similar to other server-side scripting that are used on other platforms such as Perl, Python, and so on.

When the user selects to make an over IP telephone call, it triggers the corresponding ASP Call.asp 242 which connects the user to the ACD application 254. The ACD server in turn directs the user call to the appropriate live advisor 106 by retrieving the ConnectTo Agent.asp file and lunches the agent call management software such as CosmoCall Agent™. The web server 114 also provides the live advisor with static HTML pages 284 and ASPs. A video file request may launch the GetVideo.asp file 274 that would retrieve the corresponding video file from the video file archive 276. A voice mail request may activate the Get Voicefile.ap which would retrieve the corresponding Audio File from the Audio File archive 280. A coaching request would trigger the GetCoach Data.asp file 240 and the GetCoach Rules.asp 282. The ASP script would connect to the Calico Configurator™ 250 through the coaching engine API 248. The GetCoach Data.asp 240 also retrieves user data from the appropriate databases 256.

Figure 11:
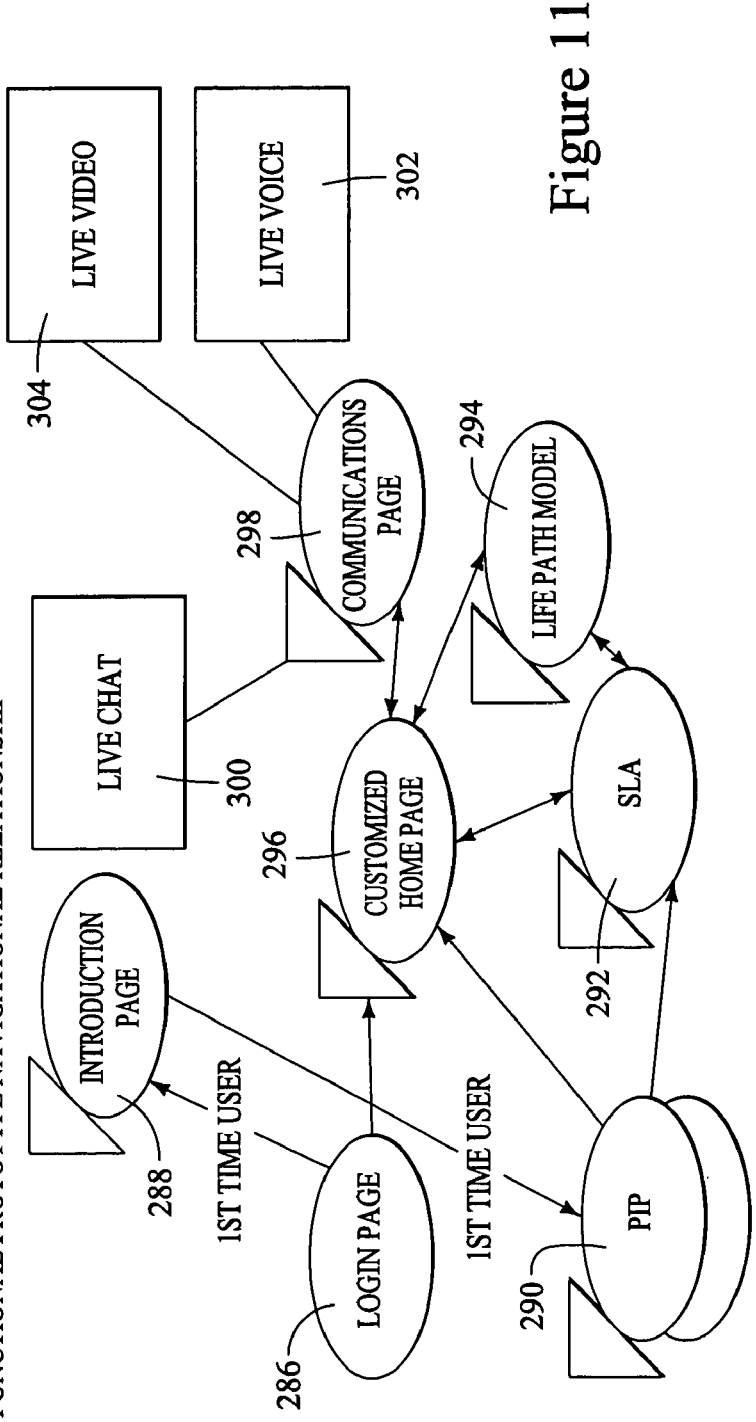
FIG. 11 shows a representative navigational relationship between the various web pages of a financial modeling and counseling system.

FIG. 11 shows a representative navigational relationship between the various web pages of the financial modeling and counseling system 102 in an embodiment of the present invention. When the user connects to the financial modeling and counseling system 102, the first web page he sees is the login page 286. After the user inputs his login name and password, the firewall server 112 authenticates the user's identity allows the user to proceed to the next page. A user who has not yet signed up may be allowed to access an informational web page such as the introduction web page 288. A first time user is directed to an introduction web page where basic information about the system is present to the user, such as how to get help and how to operate in the financial modeling and counseling system's environment.

In one embodiment of the present invention, the user is next directed to a set of Personal Interaction Profile (PIP) pages 290, where the user completes questionnaires including basic personal information such as the user name, address and telephone number.

In another embodiment of the present invention, once the PIP page is completed the user may either "surf" to his customized home page 296 or go to the Service Level agreement Web page 292 where the user negotiates a service level agreement setting a user's level of service desired from the financial modeling and counseling service. The service level agreement and the operation of the Financial Modeling and Counseling System is described further in the related U.S. applications titled Financial Portfolio Risk Management, application Ser. No. 09/705,287, A Financial Planning and Counseling System Projecting User Cash Flow, application Ser. No. 09/705,288, and Financial Modeling and Counseling System, application Ser. No. 09/705,154, Automated Coaching for a Financial Modeling and Counseling System, application Ser. No. 09/705,255, and A User Interface for a Financial Modeling System, application Ser. No. 09/704,838, all by the same inventors as the present application, and all filed on the same day as the present application and herein incorporated by reference.

In a preferred embodiment of the present invention, after completing the Personal Interaction Profile the user may proceed to his customized home page 296. Repeat users can arrive at there customized home page 296 immediately after logging in at the login page 286. In the customized home page 296, the user may select to go to Service Level Agreement page 292 to modify the service level agreement, or select to use one of the financial modeling systems such as the LifePath model page 294. The LifePath model integrates the user's revenue expectation and expense expectations over a period of time into an aggregated cash flow model. The model highlights potential problem areas to the user and recommends solutions either through automated coaching or a live advisor.

If the user decides to communicate with a live advisor, he may move to a communication web page 298 from his customized home page 296 or directly from the LifePath model page 294. Once a communication option is selected, the communication page 298 a new window may open for that particular communication. Examples of possible communication options pages are live chat 300 or live voice 302 or live video 304.

In one embodiment of the present invention, each communication option opens a new web page. In another embodiment of the present invention, the selection of a communication option opens a new window within the existing web page.

Figure 12:
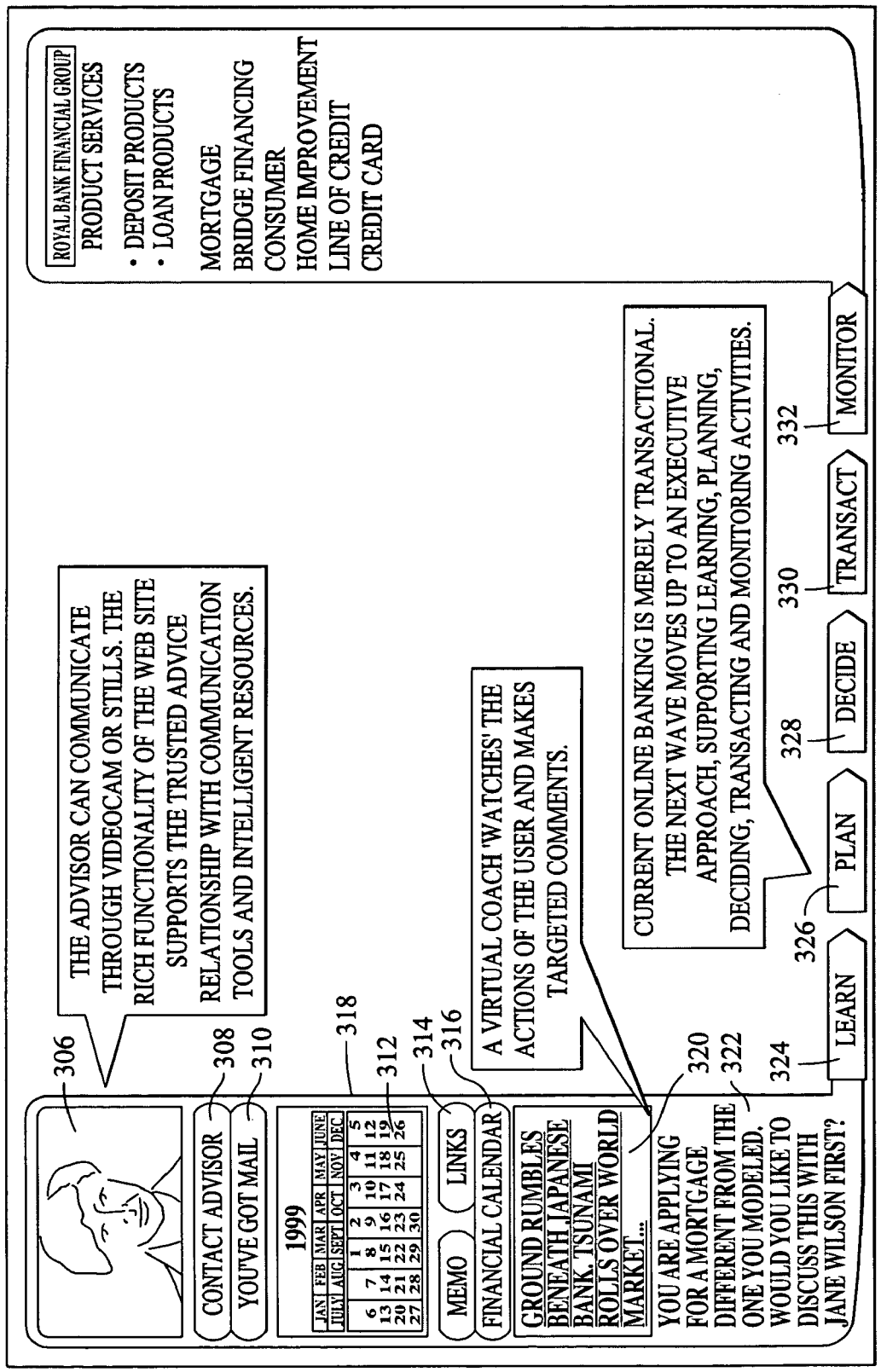
FIG. 12 is an illustration of a LifePath model web page interface.

FIG. 12 is an illustration of a LifePath model web page interface. The web page of FIG. 12 shows a customized web site and an intuitive user interface for the LifePath model subsystem. As previously discussed, the web site would be a personalized web site which a client uses to collaborate with a dedicated virtual (or live) financial advisor. As depicted, the graphical user interface can include an advisor area 306, where images of the live advisor may be represented as still images, as streaming video, or represented by a character. Selecting a link, such as the Contact Advisor link 308 shown, causes a connection to the advisor to be established. Preferably, the advisor and the user are able to communicate orally via network telephony of a type known in the art, but communication via email, chat, telephone call, or of any other type is acceptable as discussed in FIG. 2.

The advisor uses the space to negotiate an initial Service Level Agreement (SLA), and begin the modeling of the customer's Lifepath. This flushes out issues and permits an early estimate of customer value potential. The SLA nails down how much advisor time the customer wants, how information will be shared, and how much intentions-based advice the customer will welcome. The advisor configures the Web site in accordance with this agreement. The investment of effort in this, along with the personal online relationship begins to develop "stickiness." Much of the communication presented by the system is generated by rule-based business logic. This is what leverages the advisors, extending their reach. It should be noted that the client negotiates a Service Level Agreement at the start of the relationship for desired level of advisor support and how the bank may or may not use their personal information. Website functionality can provide new levels of customer support even if customer wants low level of advisor interaction.

A link 310 may be provided that allows access to email. Other links can include a link 312 to personal memoranda, a link 314 to a links page, and a link 316 to a financial calendar. As an option, a calendar 318 and links 320 to news stories may be displayed on the page. In one embodiment of the present invention, the news can be customized by each user to fit his individual needs.

A virtual coach area 322 of the page can be provided to display the comments and advice created by the virtual coach. As described above, client data drives a rules-based "advice engine" that dynamically analyzes customer needs and automates most of advisor's work. The client is encouraged to consolidate all their financial information in the site, recognizing assets and liabilities with other financial institutions. The virtual coaching area can be used both as customized coaching and as a platform to introduce various financial products, including third party products brokered by the financial institution that provides access to the financial coaching system.

Upon selection of a button depicted along the bottom of the screen, a particular feature of the financial management system is displayed. For example, selecting the learn button 324 may bring up a portion of the screen (or a new screen) that discusses the functions and features of the financial management system. In an alternative embodiment, the learn button may be used to obtain specific information on the financial products presented to the user. The plan button 326 may display the LifePath model in time series form. A decide button 328 may display a screen that allows the user to make financial decisions, such as allowing a user to select transactions recommended by the advisor and/or the virtual coach. A transact button 330 may display a transaction screen on which the user performs transactions. A monitor button 332 may display current and/or historical information about transactions made by the user and/or financial performance.

The LifePath interactive financial model captures customer's intentions at the start of the relationship and displays them as lifetime cash flow requirements. Customer data and LifePath information combine to form a deep understanding of the customer's financial needs at each stage of life. Using dynamic, interactive multimedia, it quickly captures the customer's intentions and expectations about an ideal future. This flushes out some issues which trigger the initial discussions in the relationship. It also supports estimating the lifetime value of the customer and the appropriate levels of service. The data from this model combines with insight from product and transaction history as well as real time input from the abundance of interactive models to power rule-based advice engines. This automated advice leverages the advisor's time so that a broad customer based can be profitably supported. Configured using sliders and other interactive controls, there is little typing to slow the process down. The controls build a linear graphic representation of a life path which models predictable life transitions over time more effectively then data-driven calculators. Sales opportunities, lifetime customer value and appropriate fee structure are now more accurately identified.

Risk analysis may be integrated into the LifePath model enabling clients to better understand their financial health and to improve trade-off decisions. Formulating a personal risk/reward strategy is difficult. The LifePath model supports a risk simulator, showing how the ideal model would be impacted by typical life crises. The model can be played repeatedly with varying outcomes to foster an intuitive understanding of exposure and to provide grounded input into trade-off decisions. Using the risk modeling tools, the advisor can add value, consolidate the relationship and rationalize a stream of product sales.

Figure 13:
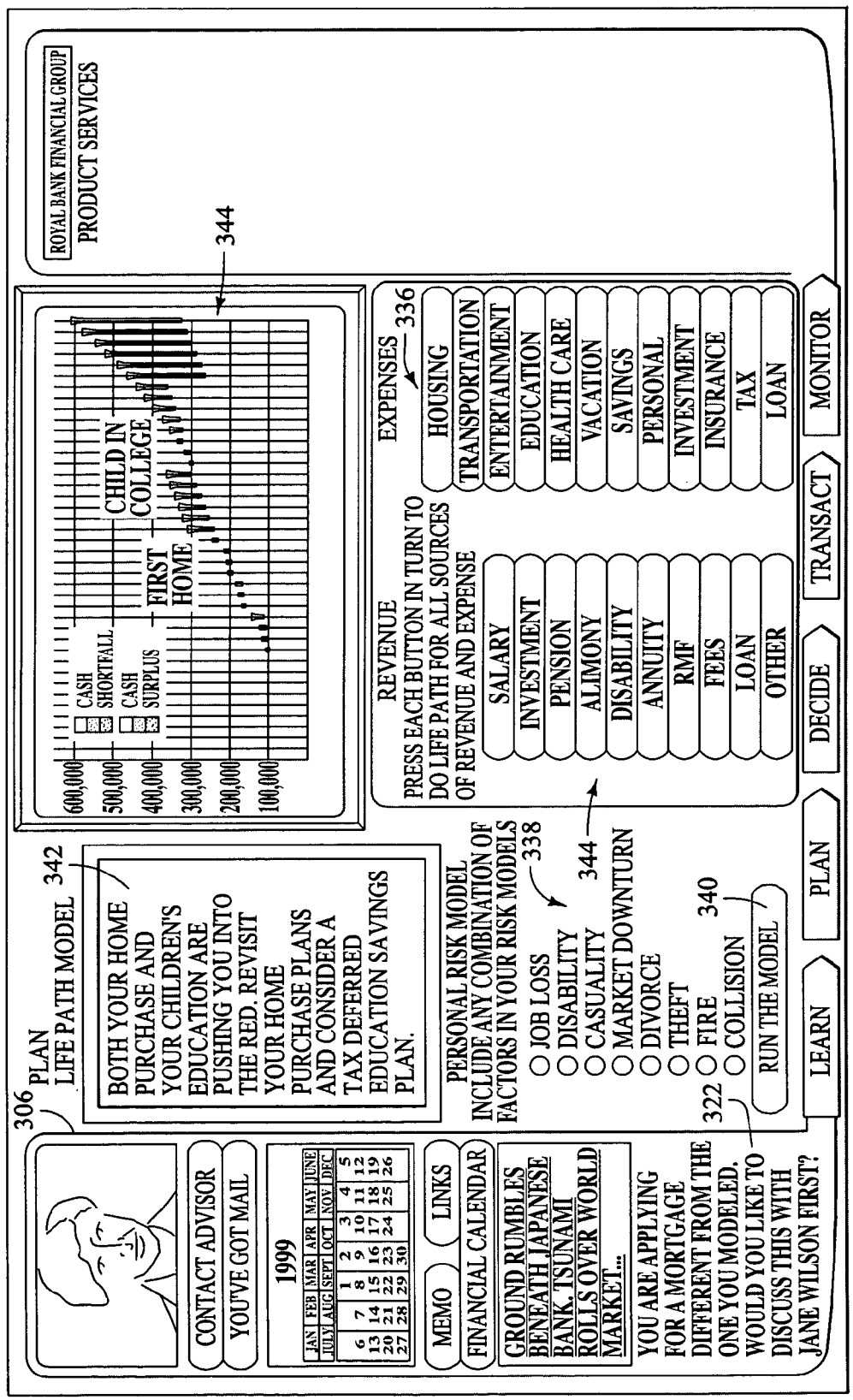
FIG. 13 is another illustration of a LifePath model web page interface.

As shown in FIG. 13, LifePath model 294 captures the user's life intentions expressed as revenue intentions 334 and expense intentions 336. As discussed above, revenue intentions 334 are a summary of the user's expense information 336. The user is provided with an individual button for each of the income information categories 334. For example, the user can input their income information such as salary, investment, pension, alimony, or disability, or other financial information as shown in FIG. 13. Similarly, the user can input their expense intentions which are shown by the category of interactive buttons 336. For example, the user can input expense information such as housing, transportation, education, health care, or other expense information as shown in FIG. 13. Neither the income category nor the expense category is limited to the displayed icons. The "other" button under the revenue category enables the user to input user specific sources of revenue such as inheritance. Same flexibility applies to the expense category allowing the user to input types of expenses not categorized under the standard expense icons. The user may import his past revenue and expenses from financial programs such as Quicken™ or MS Money™ simplifying reducing the amount of typing necessary to do so.

Additionally, the user can control the level of risk that the model considers by selecting one or more of the graphical user interface ("GUI") elements from the list of risk events 338. The risk events 338 include various life events that may affect the user's life path model. For example, the user can request that the model include job loss, disability, casualty, market downturn, or other personal risk factors into their life path model. In one embodiment of the present invention, the risk modeling component uses actuarial data from outside databases to supply the data related to the probability and the effect of the occurrence of a particular risk event. Alternatively, the user may estimate the impact of a particular risk event. For example a user may estimate the possibility of a job loss knowing his skill sets and the status of the job market. Furthermore, he can better predict the length of time he may be out of work. On the other hand automated coaching, based on actuarial and economic data, may estimate an average length of time a typical person in the user's field of expertise may remain out of work after a job loss. The user may accept or reject the automated coach's estimates and use his own information.

After providing the model with his or her life intentions expressed as revenue intentions 334 or expense intentions 336 in addition to any of the risk events, the user can select button 340 to run the life path model and initiate the advice generating subsystem. Accordingly, the user is provided with detailed advice in window 342 that is tailored to the user's life intentions and the risk events specified. As shown in window 342, the user is provided with a clear automated coaching tailored to his or her life intentions gathered by the LifePath model. Furthermore, the coaching incorporates the risk events specified from the risk factors 338. The graphical display 344 in FIG. 13 is a time series representation of the aggregated total of the user's cash flow over a selected period of time, based on the user provided revenue intentions 334 and expense intentions 336.

Additionally, the system provides the user with virtual coaching that watches the actions of the user while progressing through the LifePath model and provides the user with suggestions to ensure that they continue to comply with his or her life intentions.

In another embodiment of the present invention, the financial coaching system 132 includes a portfolio modeling tool subsystem 346. The user would get to the model either after having setup a financial profile through the LifePath model 294 or he can access the financial portfolio building model directly.

Figure 14:
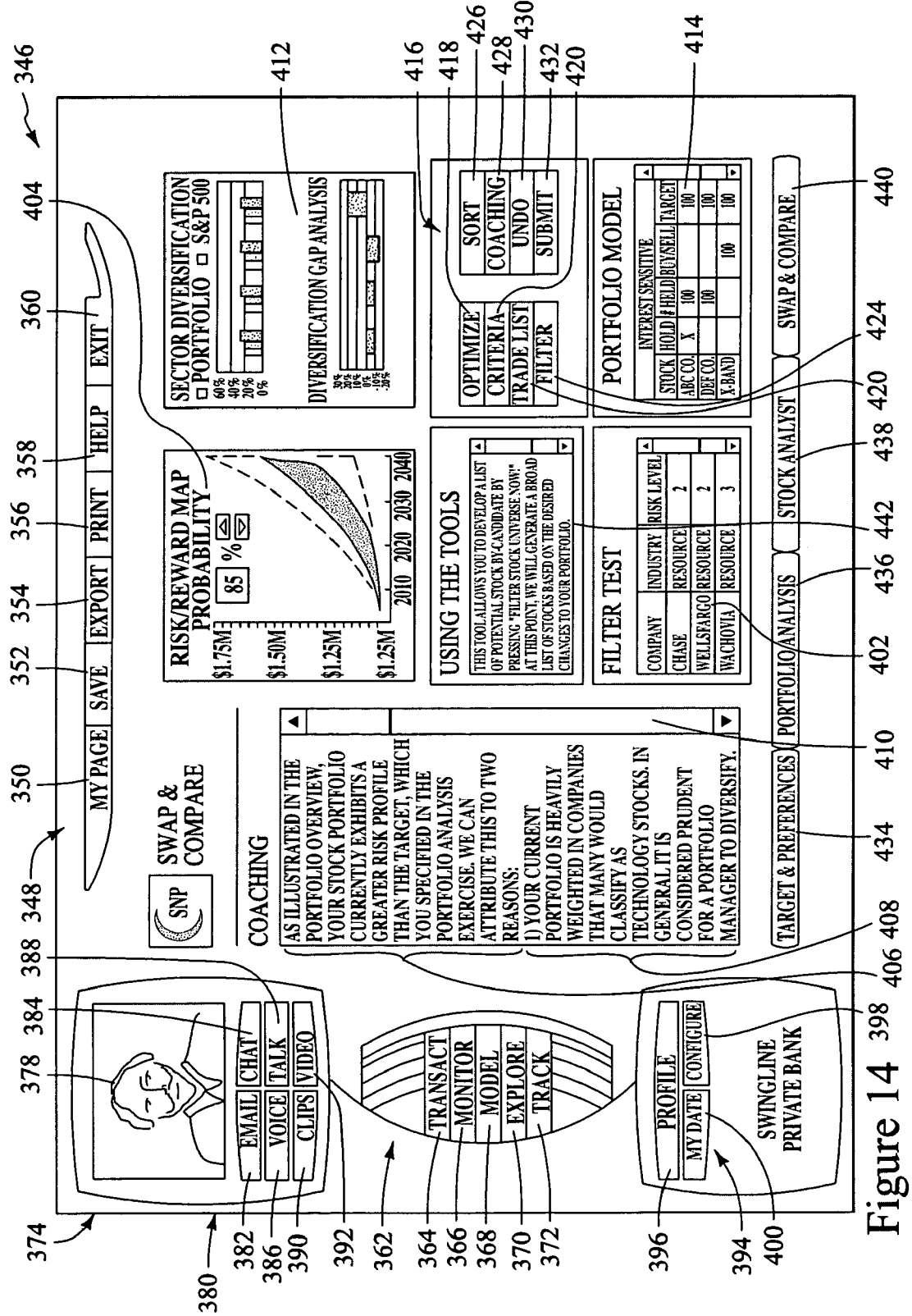
FIG. 14 is an illustration of an Investment Portfolio generator web page interface.

FIG. 14 is an exemplary graphical user interface 346 that embodies the various concepts and methods set forth for financial portfolio modeling. As shown, the graphical user interface 346 includes a plurality of fundamental selection icons 348 including a my page icon 350 for displaying a graphical user interface specifically tailored for a particular user, a save icon 352 for saving any changes made to the graphical user interface 346, an export icon 354 for exporting data displayed by the graphical user interface 346, a print icon 356 for printing various fields of the graphical user interface 346, a help icon 358 for obtaining help information, and an exit icon 360 for exiting the graphical user interface 346.

My page icon 350 displays a web page that can be customized to each user's need, simplifying the use of the portfolio model 346. In one embodiment of the present invention, the portfolio modeling system uses the Open File Exchange (OFX) protocol which has become the standard protocol for the exchange of financial information over a wide area network, and particularly the Internet. Thus exported data from the portfolio modeling system into other financial programs is formatted to be easily usable by these programs.

Further displayed on the graphical user interface 346 is a plurality of mode icons 362 for initiating various modes of operation. The mode icons 362 include a transact icon 364 for initiating transactions involving the purchasing and selling of investments utilizing a network, a monitor icon 366 for monitoring the performance of the investments, a model icon 368 for generating an investment model based on criteria entered by the user, an explore icon 370 for retrieving information on the investments, and a track icon 372 for tracking the investments utilizing the network. The Wide Area Network 128 is the Internet and the portfolio modeling system has access to outside databases such as Reuters and Bloomberg for historical and current securities pricing or market indexes.

With continuing reference to FIG. 14 a communication medium 374 may be employed to converse with other users, namely financial advisers, etc. Such communication medium 374 includes a window 378, and a plurality of communications icons 380 that enable various types of communication between the user and the live coach or advisor. Such communications icons 380 include an e-mail icon 382, a chat icon 384, a voice icon 386, a talk icon 388, a clips icon 390, and a video icon 392. The mail server 150 and call center 153 allow the user to contact the advisor by email or telephone call using the talk icon. The Automatic Call Distributor (ACD) server 158 further supports live chat 384 and voice over Internet Protocol is used when voice icon 386 is selected. A collaborative medium such as a collaborative medium such as a White Board™ is used when any of the interactive communication method such as chat or voice over IP is used. Depending on the bandwidth available to the user, he may receive still pictures or live streaming video of the advisor, or he may see an animation.

Using the graphical user interface 346, a user profile may be viewed and adjusted using a plurality of profile icons 394. The profile icon 396 opens a profile window where the user can make basic changes to his personal and financial profile. The configure icon 398 and the date icon 400 allow the user to set up his configure his portfolio and set the date. This ease of use helps the user to feel comfortable with the system and trusting of it, allowing him to take full advantage of the all the integrated features of the system.

A filtering field 402 is also shown in FIG. 14. Such filtering field 402 includes a plurality of companies and associated risk levels and industries which are displayed in accordance with the user's appropriate tolerance to risk and investment style. A risk/reward map 404 is also shown displaying the probability of the user reaching its financial goals. Also shown is a coaching window 406 for displaying coaching strings 408 based on a rule-based automated coaching engine. Such window 406 may include a field adjustment bar 410 in order to facilitate viewing of the coaching strings 408.

Further features associated with the graphical user interface for the portfolio modeling include an information window 412 which illustrates various charts pertaining to sector diversification and other investment parameters. A portfolio model window 414 may also be displayed for portfolio modeling purposes. It should be noted that the various services provided by the present invention might be initiated by selecting corresponding service icons 416. The optimize icon 418 optimizes a securities list based on the newly specified criteria. The criteria icon 420 enables the user to introduce additional criteria for selecting a particular security. The trade list 422 displays the system recommended securities that should be sold based on the user criteria and his personal financial parameters. The filter icon 424 generates a filtered list of securities displayed in the filtered list window 402. Sort icon 426 sorts the list of securities based on a user selected criteria such as alphabetical order. The coaching icon 428 generates context sensitive coaching related to the user's financial portfolio. The undo icon 430 undoes a specific swap of securities. The submit icon 432 submits and the user changes to his portfolio during the current session.

The user can set a target goal for his investment portfolio as well as his preferences by selecting the target and preference icon 434. He may do an analysis on his past or present portfolio by selecting the portfolio analysis icon 436. He may trigger specific coaching on specific a security or group of securities or even on whole industry sectors, as well as request more detail information by selecting the stock analyst icon 438. He may further model and analyze the effect of inclusion or exclusion of particular securities on his portfolio by swapping stocks in and out of the portfolio 440.

When selecting a particular icon corresponding to the various tools, a corresponding help text string appears in the help screen 442, directing the user on how to use the particular tool.

The various embodiments described above are provided by way of illustration only and should not be constructed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

The invention claimed is:

1. A method for providing a communication medium over a wide area network, including the Internet, for the primary purpose of providing a financial modeling and counseling system comprising:
   providing financial modeling, wherein the financial modeling includes a profile of a user;
   directly providing to the user automated customized financial coaching in a web-based environment based on the financial modeling and reflecting the profile, wherein the customized financial coaching includes suggestions for changes to a current financial portfolio of the user, wherein the suggestions are presented in a natural language format, and wherein the suggestions include financial products and recommended securities for the user to purchase;
   displaying to the user a plurality of communication options with a live financial advisor in said web-based environment;
   enabling a communication medium between said user and the live financial advisor based on the user selected communication option whereby said live financial advisor provides live financial coaching such that said user is assisted in achieving financial goals and optimizing long-term goals;
   establishing a communication between said user and said live financial advisor transmitting streaming live video or still video clips upon the user's selection;
   establishing a plurality of service levels such that each of the service levels includes a unique combination of type of financial modeling, type of financial coaching, and amount of communication between the user and the live financial advisor; and
   selecting one of the plurality of service levels to determine the type of financial modeling, type of financial coaching, and amount of communication between the user and the live financial advisor available to the user in the financial modeling and counseling system.

2. The method of claim 1 further comprising:
   establishing an electronic mail communication between said user and said live financial advisor utilizing the Internet upon said user's selection of the electronic mail option.

3. The method of claim 1 further comprising:
   establishing an online chat communication between said user and said live financial advisor utilizing the Internet upon the user's selection of the online chat option.

4. The method of claim 1 further comprising:
   establishing a voice communication between said user and said live financial advisor transmitting streaming live audio using said Internet upon the user's selection of the voice option.

5. The method of claim 1 further comprising:
   establishing a voice communication between said user and said live financial advisor using the telephone and utilizing the Internet upon the user's selection of the talk option.

6. A communication system over a wide area network, including the Internet, for the primary purpose of providing a financial modeling and counseling system comprising:
   an automated coaching engine providing financial coaching and financial modeling directly to a user in a web-based environment coupled to the Internet, wherein the financial coaching is based on the financial modeling, wherein the financial coaching includes suggestions for changes to a current financial portfolio of the user, wherein the suggestions are presented in a natural language format, and wherein the suggestions include financial products and recommended securities for the user to purchase;

a web server providing a variety of communication options the user, coupled to the Internet;

a communication center coupled to the Internet, enabling said user to communicate with a live financial advisor using a communication medium selected by the user whereby said live financial advisor provides financial coaching such that said user is assisted in achieving financial goals and optimizing long-term goals;

a communication means between said user and said live financial advisor transmitting streaming live video or still video clips upon the users selection; and a service level agreement establishing a plurality of service levels such that each of the service levels includes a unique combination of type of financial modeling, type of financial coaching, and amount of communication between the user and the live financial advisor selecting one of the plurality of service levels to determine the type of financial modeling, type of financial coaching, and amount of communication between the user and the live financial advisor available to the user in the financial modeling and counseling system.

7. The system of claim 6 further comprising an electronic mail server coupled to the Internet providing electronic mail communication between the user and the live financial advisor, upon the user's selection of said electronic mail option.

8. The system of claim 6 further comprising:
an electronic chat server coupled to the Internet providing live electronic chat between said user and said live financial advisor upon the user's selection of said chat option.

9. The system of claim 6 further comprising:
a communication center coupled to said wide area network providing live voice communication over the Internet between the user and the live financial advisor upon the user's selection of said voice option.

10. The system of claim 6 further comprising:
a communication center coupled to the Internet providing live voice communication between said user and said live financial advisor upon the user using a stand alone telephone.

11. The system of claim 6 further comprising:
a user interface coupled to the Internet providing a collaborative medium for sharing data between said user and said live financial advisor upon the selection of a communication option.

12. A computer program embodied on a computer readable medium for providing a communication medium over a wide area network, including the Internet, for the primary purpose of providing a financial modeling and counseling system comprising:

code segment providing financial modeling, wherein the financial modeling includes a profile of a user;

code segment providing directly to the user customized automated financial coaching in a web-based environment based on the financial modeling and reflecting the profile, wherein the customized financial coaching includes suggestions for changes to a current financial portfolio of the user, wherein the suggestions are presented in a natural language format, and wherein the suggestions include financial products and recommended securities for the user to purchase;

code segment displaying to the user a plurality of communication options with a live financial advisor in the web-based environment;

code segment enabling a communication medium between said user and the live financial advisor based on the user selected communication option whereby said live financial advisor provides live financial coaching whereby said user is assisted in achieving financial goals and optimizing long-term goals;

code segment establishing communication between said user and said live financial advisor transmitting streaming live video or still video clips upon the user's selection;

code segment establishing a plurality of service levels such that each of the service levels includes a unique combination of type of financial modeling, type of financial coaching, and amount of communication between the user and the live financial advisor; and code segment selecting on of the plurality of service levels to determine the type of financial modeling, type of financial coaching, and amount of communication between the user and the live financial advisor available to the user in the financial modeling and counseling system.

13. The computer program embodied on a computer readable medium of claim 12 further comprising code segment establishing a voice communication between said user and said live financial advisor transmitting streaming live audio using the Internet upon the user's selection of the voice option.

14. The computer program embodied on a computer readable medium of claim 12 further comprising code segment establishing a voice communication between said user and said live financial advisor using the telephone an utilizing the network upon the user's selection of the talk option.

15. The computer program embodied on a computer readable medium of claim 12 further comprising code segment providing a collaborative medium for sharing data between said user and said live financial advisor upon the selection of a communication option.

* * * * *

UNITED STATES PATENT AND TRADEMARK OFFICE
CERTIFICATE OF CORRECTION

| | | |
|---|---|---|
| PATENT NO. | : 7,315,837 B2 | Page 1 of 1 |
| APPLICATION NO. | : 09/929735 | |
| DATED | : January 1, 2008 | |
| INVENTOR(S) | : Ronald E. Sloan et al. | |

It is certified that error appears in the above-identified patent and that said Letters Patent is hereby corrected as shown below:

Title Page
Insert Item (63): --Related U.S. Application Data--
then after "Related U.S. Application Data"
Insert --(63) Continuation of application No. 09/705,290, filed on Nov. 1, 2000, now abandoned, and a continuation-in-part of application No. 09/431,389, filed on Nov. 1, 1999, now abandoned, and a continuation-in-part of application No. 09/452,273, filed Nov. 30, 1999, now abandoned, and a continuation-in-part of application No. 09/579,849, filed May 25, 2000, now abandoned.--

Claim 7, column 17, line 8, after "options" insert --to--

Claim 14, column 18, line 48, delete "an" and insert --and--

Signed and Sealed this

Twenty-seventh Day of May, 2008

JON W. DUDAS
*Director of the United States Patent and Trademark Office*